July 26, 1966 H. HURVITZ 3,263,019

RANDOMIZATION OF PHASES AND FREQUENCIES OF MUSICAL SPECTRA

Filed March 18, 1964

INVENTOR

HYMAN HURVITZ

BY Hurvitz & Rose

ATTORNEYS

United States Patent Office 3,263,019

Patented July 26, 1966

3,263,019

RANDOMIZATION OF PHASES AND FREQUENCIES OF MUSICAL SPECTRA

Hyman Hurvitz, 822 Warner Bldg., Washington, D.C.

Filed Mar. 18, 1964, Ser. No. 352,762

18 Claims. (Cl. 84—1.24)

Figure 1:
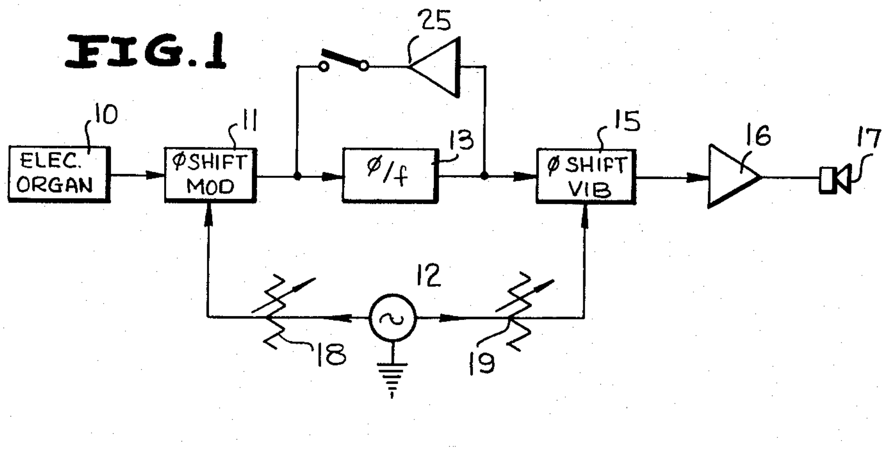

The present invention relates generally to enhancement of electric organ tones, and more particularly to systems for introducing continuously varying phase dispersal, and controllable frequency modulation into the tonal output of an electric organ system.

Many present day electric organs employ so-called phase locked generator systems, i.e., those in which sawtooth waves are used as single tones and in which all tones of a single nomenclature derive from a chain of frequency dividers, so that all have the same zero phase. Such waves can produce large power peaks, especially when multiple notes of the same nomenclature are played. These require amplifiers and speakers capable of handling the peak powers. The phases of the waves can be dispersed, to eliminate the peaks. Thereby tonal quality is enhanced, and peak power capability requirements reduced. If the output of the organ is vibrato or frequency modulated, the phases of the various frequency components are continuously varied, and since $d\phi/dt$ is equal to frequency, new frequency components are generated.

It is an object of the present invention to provide wide continuously variable phase dispersals in the tones of a music system without thereby introducing unpleasant audible effects, such as accompany wide deviation vibrato.

Briefly describing a preferred embodiment of the invention, the output of an electrical organ is very widely frequency modulated, at a slow rate, i.e., 1 c.p.s., at a vibrato rate, or at 6–8 c.p.s., or in response to narrow band noise. This is accomplished by a phase shift modulation bridge, which may shift all the frequencies of an audio band identically. The modulated signal is applied to a $\phi/f$ network which shifts phase as a function of frequency, so that higher frequencies receive a greater phase dispersion. The resulting spectrum is then frequency modulated by a bridge modulator in opposite sense to the first modulator, but with the same modulating wave form. Thereby, the original wide deviations are either substantially eliminated or reduced, as desired.

If all deviations due to the bridge modulators are removed, there nevertheless remains the continuously varying phase dispersions due to the $\phi/f$ network, which can now be quite large. New frequencies are introduced by the variations of phase, and these occur at the rate and waveform of the modulating signal, if phase dispersion is linear. The rates can be different for different audio frequencies by shaping the $\phi/f$ slope of the network for the entire audio band non-linearly.

It is a particular object of the invention to provide an audio modulation system in which the audio output is, in sequence, frequency modulated in one phase, phase dispersed as a function of frequency, and then frequency modulated in opposite phase, the modulation signal being of the same shape in both modulators and consisting of waves of any desired shape including noise, normal vibrato frequency and slow vibrato.

It is another object of the invention to provide a reverberator in a music system with widely deviating tones, the deviations being at least partially outphased in the audio output.

Figure 2:
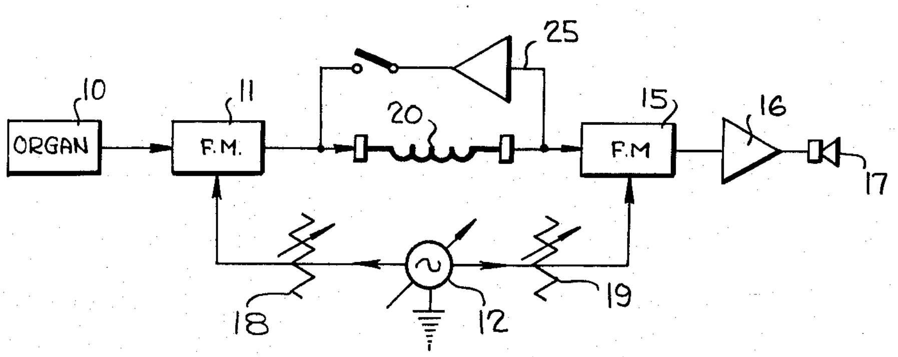
Figure 3:
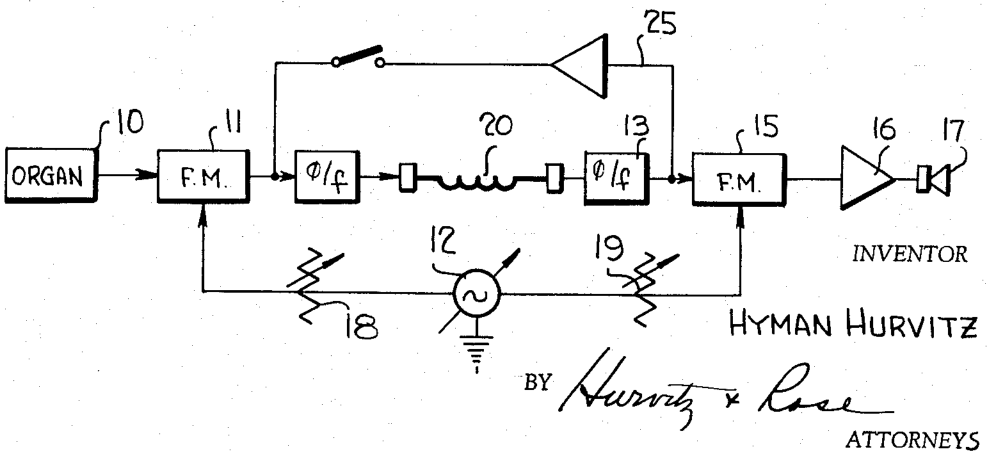

The above and still further objects, features and advantages of the present invention will become apparent upon consideration of the following detailed description of one specific embodiment thereof, especially when taken in conjunction with the accompanying drawings, wherein:

FIGURES 1–3 are block diagrams of systems according to the invention.

In the drawings, 10 is an electric organ or other music source. If an electric organ it may be of the phase locked type.

The output of the organ 10 is applied to a phase shift modulator 11, preferably of the bridge type, which is supplied with modulating signal of one phase from a source 12. The latter may be noise, sine wave at 7 c.p.s., or sine wave at 1 c.p.s.

The output of modulator 12 is applied to a $\phi/f$ circuit 13, which may be of the Bode filter type, and which shifts phase as a function of frequency without varying attenuation over the pass band. Typically, phase shift may be about $\eta$ at 500 c.p.s., about $2\eta$ at 1,000 c.p.s., etc., on a linear basis. It is best that phase shift not be increased by nearly an integral factor when frequency is increased by an integral factor. The frequency deviation can be as great as the audio signal allows, and the art permits. If the audio band goes to 30 c.p.s., it may be best to modulate only frequencies above, say, 200 c.p.s. In such case a 40 c.p.s. deviation can be used. If desired, separate octaves can be separately handled, or the audio band may be divided into only two or three sub-bands dividing at say 500 and 2000 c.p.s. In the latter case the band above 500 c.p.s. can be deviated 100 or 150 c.p.s., and that above 2000 c.p.s., 400 c.p.s. In general about a 20% maximum deviation is possible.

The stated deviation produces a large and continually varying phase dispersal, which is equivalent to frequency modulation with concurrent constant phase dispersals, different for each frequency. The output of $\phi/f$ filter 13 is applied to a further phase shift modulator 15, driven from modulation sources 12 in phase opposite to that applied to modulator 11.

The output of modulator 15 is amplified in amplifier 16 and acoustically radiated by speaker 17.

The relative amplitudes of the outputs of modulation sources 12, as applied to the modulators 11, 15, may be adjusted by potentiometers 18, 19. If the modulations are equal but opposite, all that remains is the effect of $\phi/f$ filter 13. If unequal, an adjustably deviated frequency modulation remains which may be noise modulation, slow vibrato (1 c.p.s.) or normal vibrato (7 c.p.s.).

The effect of $\phi/f$ filter 13 is greater than its own effect on the signal, because it introduces phase delay, so that modulator 15 cannot outphase precisely. But, if the modulating signal is of very low frequency while phase deviations are measured in only a few cycles even at a high frequency, this effect is secondary, but implies that higher frequencies, which suffer greater phase delays, have greater vibrato signals, i.e., their deviations are cancelled less perfectly than in the case of low frequencies. This effect is highly desirable, even in so-called zero vibrato audio.

The net effect of the system can be then a continuously varying phase dispersion, which may be of large amount if desired, or small, plus controlled frequency modulation which is enhanced as a direct function of frequency by the varying phase dispersion.

While filter 13 is shown single, it may be composed of plural parallel filters, each with its own slope. These filters may be octave filters, in the limit, and may have not only different slopes appropriate to the frequency band, but also different basic delays, if desired.

If the delay of the network 13 is, for a given freqnency, say 1000 c.p.s., equal to half the period of the vibrato frequency, then all frequencies below the given frequency will suffer deviation in one sense while all frequencies above have deviations of opposite sense. This implies that the frequency components of a single tone can be deviating in opposite senses simultaneously, a very valuable enhancement of tone, especially since the transition is smooth as a function of frequency.

The frequency modulation at the input of reverberator 20 (or $\phi/f$ filter 13 of FIGURE 1) permits use of a positive feedback network 25 having gain around the reverberator which increases delay time, and thereby permits use of a shorter line. No possibility of oscillation exists, in the system, because the fed-back signal is never equal to the input signal, except at random for a very short time. The oscillations are therefore never given time to develop. The effect of the feedback is in addition to increasing delay to randomize amplitude and phase, as the fed back signal occasionally adds to or subtracts from an input signal.

Unusual musical effects can be achieved if for the $\phi/f$ filter 13 is substituted an audio reverberator 20, preferably of the wire type, or even a simple delay line. The musical wire reverberator is, at the present time, fabricated of three springs, which are of different effective acoustic lengths. The purpose of this expedient, which is expensive, is to reduce resonances, in that a resonance in one line should not usually occur in another. Nevertheless, resonances occur, and they are troublesome because well distributed over the audio range.

In the system of FIGURE 2, since no audio frequency persists in the reverberator 20 for any length of time, resonances do not occur audibly on a statistical basis, even if only one line is employed. The effect of the actual resonances is to provide transient build up and decay, at resonant values of the line, as the frequency modulated signals pass through the resonance frequencies, which enriches the music. Thereby, a defect of the present reverberator is converted to a virture, and less expensive reverberators can be utilized.

The frequency modulation rate must be slow relative to the phase delay in the line 30. But such lines have multiple reflections, and thereby a total delay of .2 second may occur, for example, or even as much as .5 second. If the modulating frequency is between 1 and 8 c.p.s., i.e., slow or normal vibrato, the consequence of the delay is to introduce deviations of opposite sense in different portions of the audio band.

For example, assume a delay of .5 second without reflections, and a modulation rate of 1 c.p.s., the modulators being adjusted precisely to outphase in absence of reverberator 20. Introduction of the reverberator implies that any given frequency of the audio band reaches modulators 11 and 15 half a second apart, which implies, for a 1 c.p.s. rate of modulation, that the oscillator 12 has had time to reverse its phase while the audio signal was traveling down the line. Therefore, instead of outphasing modulator 15 would add deviation. But, no practical reverberator has a .5 second delay without multiple reflections. Therefore, each pass of the same signal along the reverberator will result in a different output frequency, i.e., some parts of a single reverberated signal will, on a time basis, have their deviations outphased and some will have them increased. The effect is different according to the frequency of oscillator 12, so that this oscillator is made variable. The random effects which occur can be made particularly sparkling as the frequency of oscillator 12 is made high, i.e., 30 or 40 c.p.s. The deviation should be about 20 c.p.s. or more, since reverberator resonances are about 15–20 c.p.s. apart. The novel effect occurs because of the reverberator, i.e., would not occur in absence of repetitions of the same signal due to reflections. The effect can be best understood if a single frequency pulse is transmitted. The pulse proceeds forward and back along the delay line, and for each repetition is differently deviated in frequency. While the same deviations can occur due to modulator 15 alone, the modification of resonances can occur only due to modulator 11. And the utilization of outphasing modulators implies that each deviation can be far greater than would be permissible for a single modulator, on a statistical basis. However, for pulses the modulator 11 acts only once and the modulator 15 many times, so that the system should not be used for staccato playing, except with slight deviations.

If the delay line reverberator is dispersive, different audio frequencies will be treated differently, i.e., one will deviate up while another deviates down, and this effect will occur at random. If the line is not sufficiently dispersive it can be made so by adding one or more $\phi/f$ filters in cascade, as in FIGURE 3.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In combination, a source of an audio band representing music, an audio phase modulator connected in cascade with said source, an audio filter arranged to disperse phase as a function of frequency connected in cascade with said phase modulator, a further audio phase modulator connected in cascade with said audio filter, means for deviating the phases of the audio outputs of said modulators in opposite senses, and means acoustically radiating the output of said further phase modulator.

2. In combination a source of a band of audio frequencies, a first phase shift audio frequency modulator in cascade with said source, first means for imparting a musically significant phase dispersive characteristic to said band of audio frequencies, said means being connected in cascade with said phase shift modulator, and a further phase shift audio frequency modulator in cascade with said means, a source of alternating modulating signal and second means for imparting said modulating signal to said first and further phase shift modulators, and means for acoustically radiating the audio output of said further phase shift modulator.

3. The combination according to claim 2 wherein said first means includes a wire reverberator.

4. The combination according to claim 3 wherein is further provided at least phase dispersive filter in cascade with said wire reverberator, to render said first means phase dispersive and of reverberative delay.

5. The combination according to claim 2 wherein said first means is a frequency dispersive network.

6. The combination according to claim 2 wherein said first means is a wire reverberator having an input and an output and feedback means for feeding signal back regeneratively from said output to said input.

7. In a music system a source of a band of frequencies representing music, a first audio frequency vibrato modulator connected in cascade with said source, first means for introducing audio phase delays into the several frequencies of said band of frequencies, said first means being connected in cascade with said first audio frequency vibrato modulator, a second audio vibrato modulator connected in cascade with said first means, a source of vibrato frequency signal, second means applying said vibrato signal to said first and second frequency vibrato modulators, and third means acoustically radiating the output of said second vibrato modulator.

8. The system according to claim 7, wherein said first means is a dispersive network for said band of frequencies.

9. The combination according to claim 7 wherein said first means is a reverberative device.

10. The combination according to claim 7, wherein said means applies said vibrato frequency signal to said second frequency vibrato modulator in such amplitudes as to substantially outphase frequency vibrato modulations produced by said first frequency vibrato modulator for at least some frequencies of said audio frequency band.

11. In a system for frequency modulating two different audio frequencies in different phases, a first audio modulator for phase modulating said two different audio frequencies synchronously in one phase of a modulating signal, a second audio modulator connected in cascade with said first means for frequency modulating said two different audio frequencies synchronously in a phase at least approximately opposite to said one phase, and means introducing substantially different phase delays of said two different audio frequencies intermediate said first and second means.

12. In a method of quasi-random frequency modulation of a band of audio frequencies, modulating phases of the band of audio frequencies forward through a range of frequencies at a first rate, passing the modulated band of frequencies through a phase dispersive network, and modulating the phases of the output of said dispersive network back through said range of frequencies at said first rate to produce a resultant band of frequencies having a plurality of differently frequency modulated frequencies.

13. In an electric organ, a source of harmonic rich audio tones included in said organ, a first audio frequency vibrato modulator connected in cascade with said source, a phase dispersive network in cascade with said first audio frequency modulator, a second audio frequency vibrato modulator in cascade with said phase dispersive network, and an acoustic radiation system in cascade with said second frequency vibrato modulator.

14. The combination according to claim 13 wherein is provided a regenerative feedback loop extending around said phase dispersive network.

15. The combination in accordance with claim 14 wherein is provided a regenerative feedback loop extending around said reverberative network.

16. In an audio system, a source of a band of audio frequencies, an audio phase modulator in cascade with said source, an audio wire reverberator in cascade with said phase modulator, said reverberator having an input and an output, and a regenerative audio feedback path extending from said output to said input.

17. In an audio system, a source of a band of audio frequencies, a wire reverberator in cascade with said source, an acoustic radiation system for said band of audio frequencies connected in cascade with said wire reverberator, a regenerative audio feedback path connected around said wire reverberator, and means for phase modulating audio signals in said feedback path sufficiently to prevent build up of oscillations in said wire reverberator.

18. In an electric organ, a source of harmonic rich audio tones included in said organ, a first audio frequency vibrato modulator connected in cascade with said source, a reverberative network in cascade with said first audio frequency vibrato modulator, a second audio frequency vibrato modulator in cascade with said reverberative network, and an acoustic radiation system in cascade with said second frequency vibrato modulator.

References Cited by the Examiner

UNITED STATES PATENTS

| | | | |
|---|---|---|---|
| 1,828,454 | 10/1931 | Bode. | |
| 2,358,152 | 8/1944 | Earp | 332—22 X |
| 2,362,898 | 11/1944 | Gilman | 332—22 X |
| 2,392,476 | 1/1946 | Hodgson. | |
| 2,473,318 | 6/1949 | Weighton | 332—22 |
| 3,013,212 | 12/1961 | Di Toro | 333—30 X |
| 3,118,117 | 1/1964 | King et al. | 332—22 |
| 3,136,853 | 6/1964 | Bissonette et al. | 84—1.25 X |
| 3,159,706 | 12/1964 | Leslie | 84—1.24 |
| 3,189,686 | 6/1965 | Brombaugh | 84—1.24 X |

ARTHUR GAUSS, *Primary Examiner.*

I. C. EDELL, *Assistant Examiner.*